(12) United States Patent
Bradford et al.

(10) Patent No.: US 6,400,481 B1
(45) Date of Patent: Jun. 4, 2002

(54) DEVICE FOR TRANSMITTING OPTICAL SIGNALS BETWEEN MULTIPLE DESTINATIONS

(75) Inventors: Glenn P. Bradford; Michael C. Pitruzzello, both of Huntsville, AL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/316,058

(22) Filed: May 21, 1999

(51) Int. Cl.$^7$ ................................................ H04B 10/00
(52) U.S. Cl. ...................... 359/152; 359/153; 359/159; 359/163; 385/15; 385/24
(58) Field of Search ................................. 359/163, 159, 359/152, 153; 385/15, 24

(56) References Cited

U.S. PATENT DOCUMENTS 4,733,093 A * 3/1988 Graves et al. .............. 250/551
4,850,044 A * 7/1989 Block et al. ................ 455/607
5,774,247 A * 6/1998 Taglione et al. ............ 359/152

* cited by examiner

Primary Examiner—Leslie Pascal
Assistant Examiner—Hanh Phan
(74) Attorney, Agent, or Firm—Arthur H. Tischer; Freddie M. Bush; Hay Kyung Chang

(57) ABSTRACT

Parallel data busses are embedded in multiple parallel grooves that are inscribed onto the exterior surface of a rectangular substrate or a cylindrical substrate that has a cylindrical hole running through the center thereof. These grooves which run along the length of the substrate may contain a suitable polymeric optical medium such as plexiglass or lexan or left entirely vacant to be filled with air. Optical transceivers placed to be orthogonal to the data busses and reflective conical structures positioned within the busses expedite the injection and retrieval of optical signals travelling through the data busses.

17 Claims, 9 Drawing Sheets

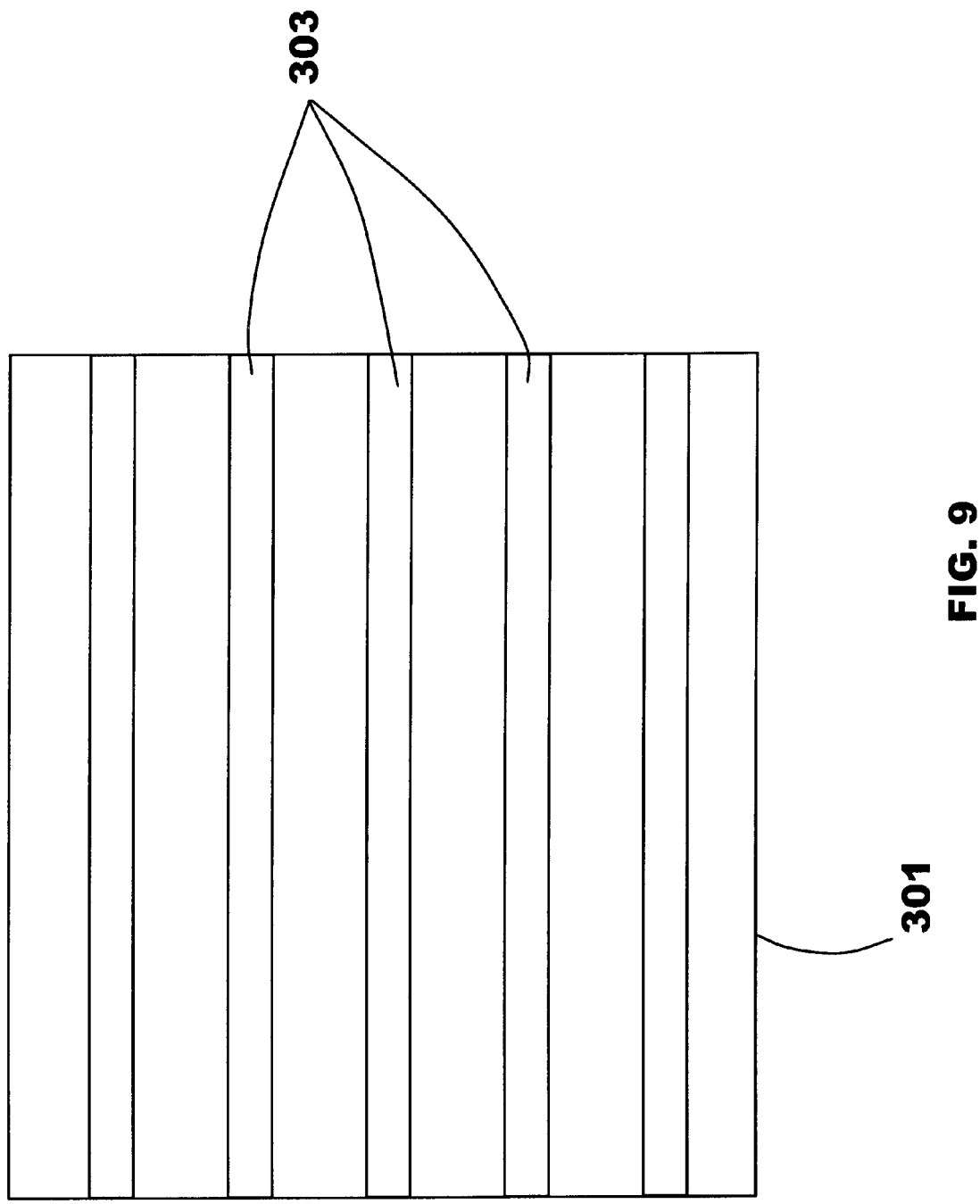

DEVICE FOR TRANSMITTING OPTICAL SIGNALS BETWEEN MULTIPLE DESTINATIONS

DEDICATORY CLAUSE

The invention described herein may be manufactured, used and licensed by or for the Government for governmental purposes without the payment to us of any royalties thereon.

BACKGROUND OF THE INVENTION

When designing a computer system that is intended for use on a missile, factors such as the size and the weight of the system as well as power consumption and the position the computer will occupy in the overall missile present unique challenges. A particularly vexing problem arises when the computer must be placed in front of a warhead that uses shaped-charge effects for its kill mechanism. In these missiles, a "free space" must be provided in front of the warhead to allow room for the formation of the "jet" that the warhead creates at detonation.

Other problems, some of which are not unique to computers in missilery, are the increased rate at which processors are required to communicate, either with themselves, memory or other devices, as new processors become faster and more processors are included in a single system. At increased communication rates, cross-talk between the individual data channels becomes more severe and more difficult to compensate for. Therefore, a data bus design is desired that accommodates the increased data transfer speed, requirement for ruggedness and economy of cost as well as a means to inject and retrieve signals easily while providing room for the formation of the jet created by the warhead of a missile.

SUMMARY OF THE INVENTION

Parallel data busses are embedded in multiple parallel grooves that are inscribed onto the exterior surface of a rectangular substrate or a cylindrical substrate that has a cylindrical hole running through the center thereof. In the case of the cylindrical substrate, the center hole provides a means for allowing the jet formation from shaped charged warheads to occur unencumbered while embedding the data busses into the body of the cylinder provides a degree of ruggedness. These grooves may contain a suitable polymeric optical medium such as plexiglass or lexan or left entirely vacant to be filled with air. Optical transceivers placed to be orthogonal to the data busses and reflective conical structures positioned within the busses expedite the injection and retrieval of optical signals travelling through the data busses.

DESCRIPTION OF THE DRAWING

FIG. 9 shows a rectangular substrate with data busses embedded on the surface thereof.

DESCRIPTION OF THE PREFERRED EMBODIMENT

Figure 1:
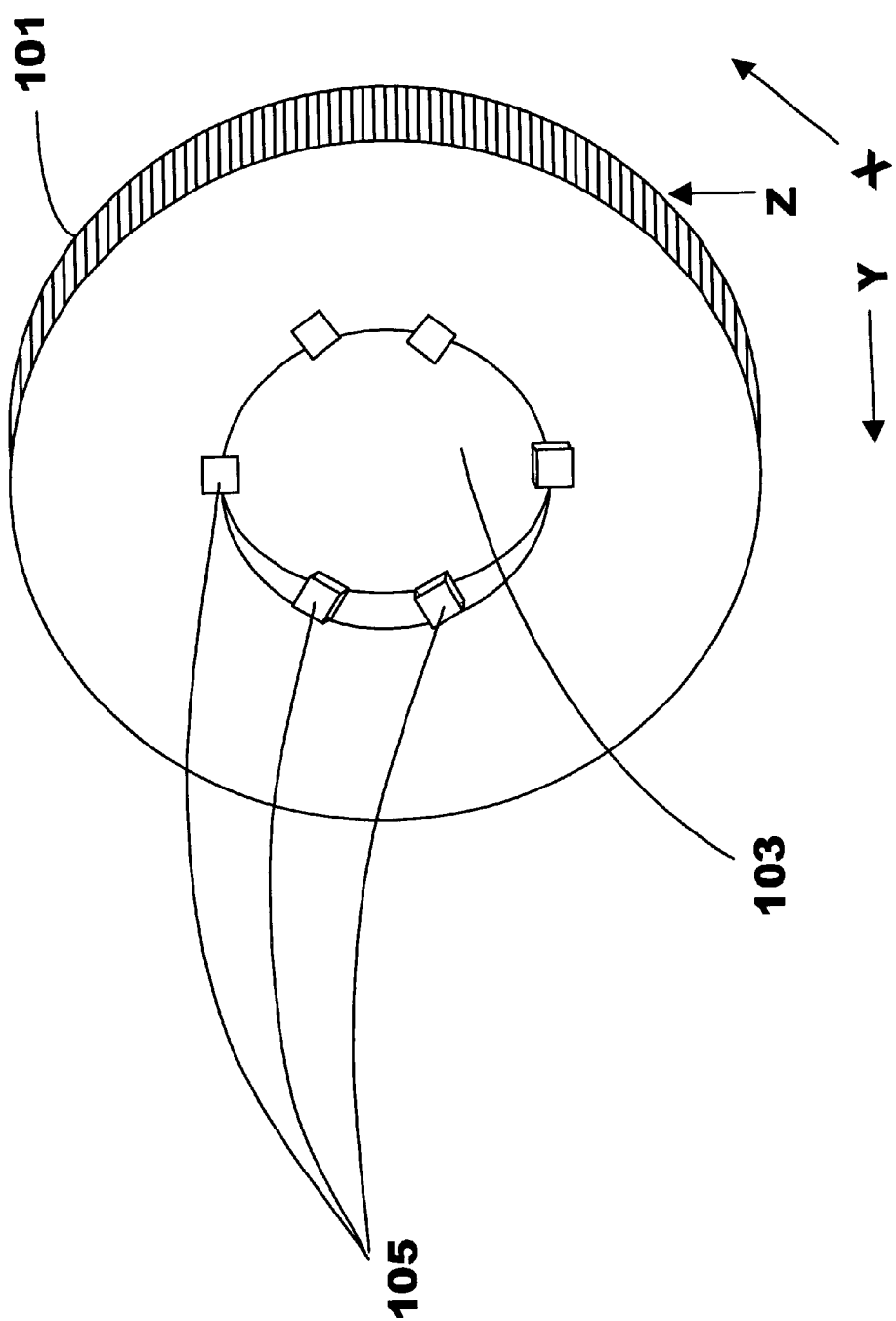
FIG. 1 depicts a representative circuit card having a center hole through which the cylindrical substrate is inserted.
Figure 2:
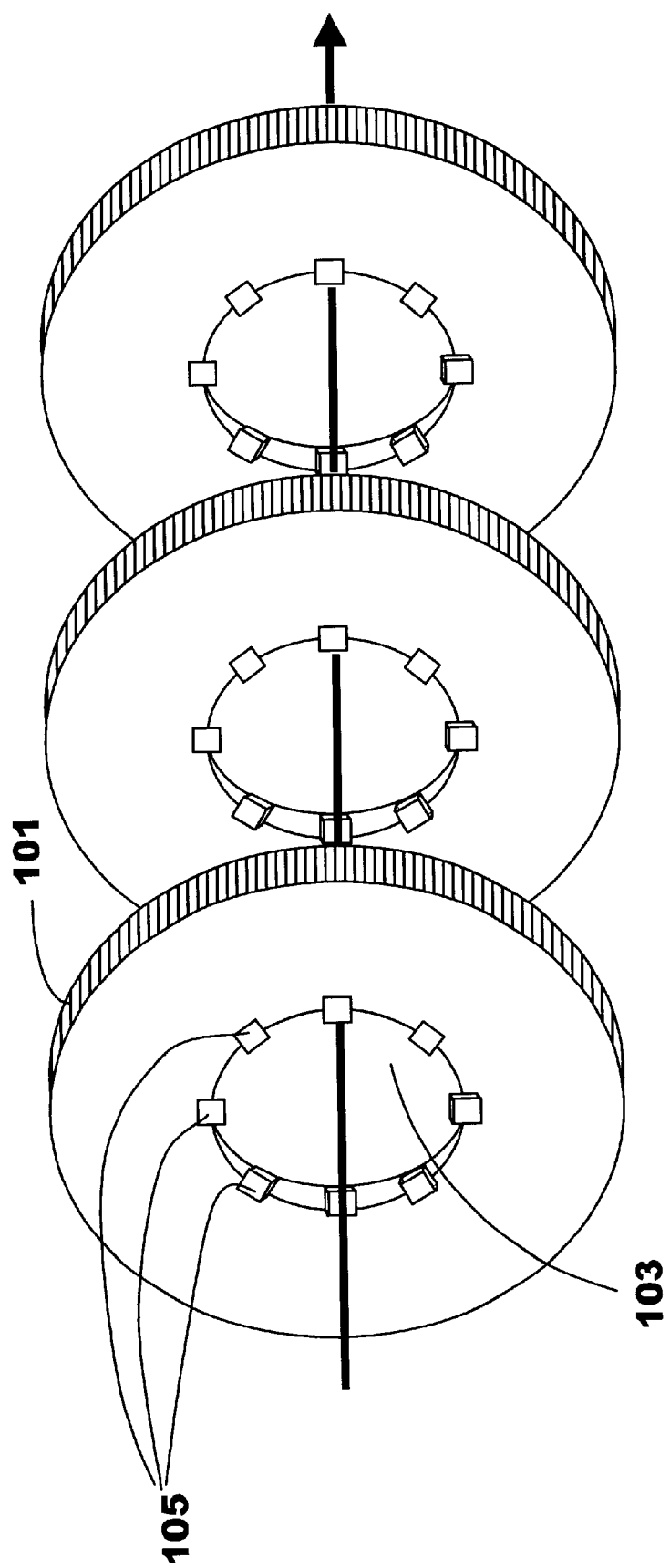
FIG. 2 shows several circuit cards stacked longitudinally through the center holes of which the cylindrical substrate is inserted.

Referring now to the drawing wherein like numbers represent like parts in each of the several figures, FIG. 1 shows representative circuit card 101 containing the computer components (not detailed in the figure) which must communicate. Circuit card 101 has in its center hole 103 which is large enough to accommodate therethrough cylindrical substrate 301. Several such cards may be stacked together longitudinally as shown in FIG. 2, each separated from the other by a variable pre-determined distance. The cylindrical substrate, which may be made of reflective material (metal or plated polymer), also has through its center cylindrical hole 305 that serves to provide room for the jet formation from shaped charged warheads to occur unencumbered upon detonation of the missile, the cylindrical substrate being placed in front of the warhead in the missile. Further, the substrate has inscribed onto its outer surface many identical grooves 303 that are parallel to each other and run along the length of the substrate. The shape of the grooves as well as the number of them depends on the communication needs which the data busses embedded in the grooves are to fulfill. However, it is envisioned that the width and depth of each groove have the same numerical value. Grooves 303 may be filled with optically transparent polymer material such as plexiglass or lexan or left vacant to be filled with air. If using a polymer material, the material may be applied as a liquid into the grooves and allowed to solidify, thereby contributing to the reduction of the manufacturing costs.

Optical transceivers 105, mounted onto the perimeter of center hole 103 of circuit card 101, provide a means for injecting optical signals into and retrieving them from the optical medium. The optical transceivers must be mounted such that when cylindrical substrate 301 is inserted through center hole 103, each transceiver 105 is positioned orthogonally with respect to the optically-conducting medium of a groove. An example of a possible transceiver is the active elements of the Motorola MT-RJ connector (HFBR-5903/5905), though a device with transmitter and receiver manufactured coaxially on a single substrate would be preferred.

In operation, when information needs to be transmitted from one circuit card to another, the first card impresses an electrical signal on various of its optical transceivers which convert these electrical signals to optical signals and inject these optical signals into the optical media of grooves 303. The signals travel by means of internal reflection within the grooves until received by optical transceivers of the second card. The received optical signals are converted back to electrical signals for use by the devices on the second card.

To allow for additional data bandwidth, one may provide for multiplexing of each groove by providing multiple optical transceivers for each groove on each circuit card, with each of the transceivers emitting and detecting optical signals of different wavelength from those of the other transceivers on that same card.

Figure 3:
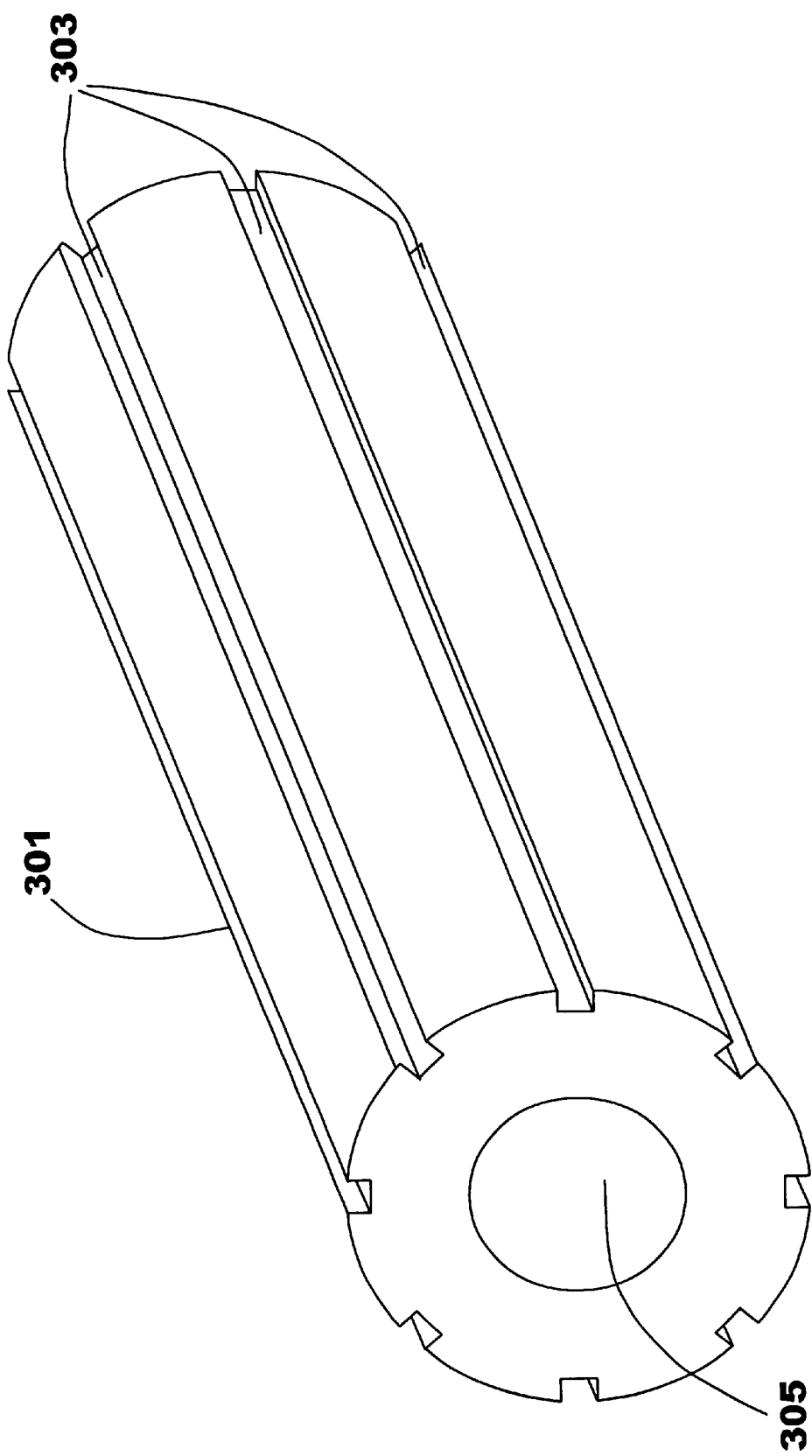
FIG. 3 illustrates the cylindrical substrate on the outer surface of which the data busses are embedded.
Figure 4:
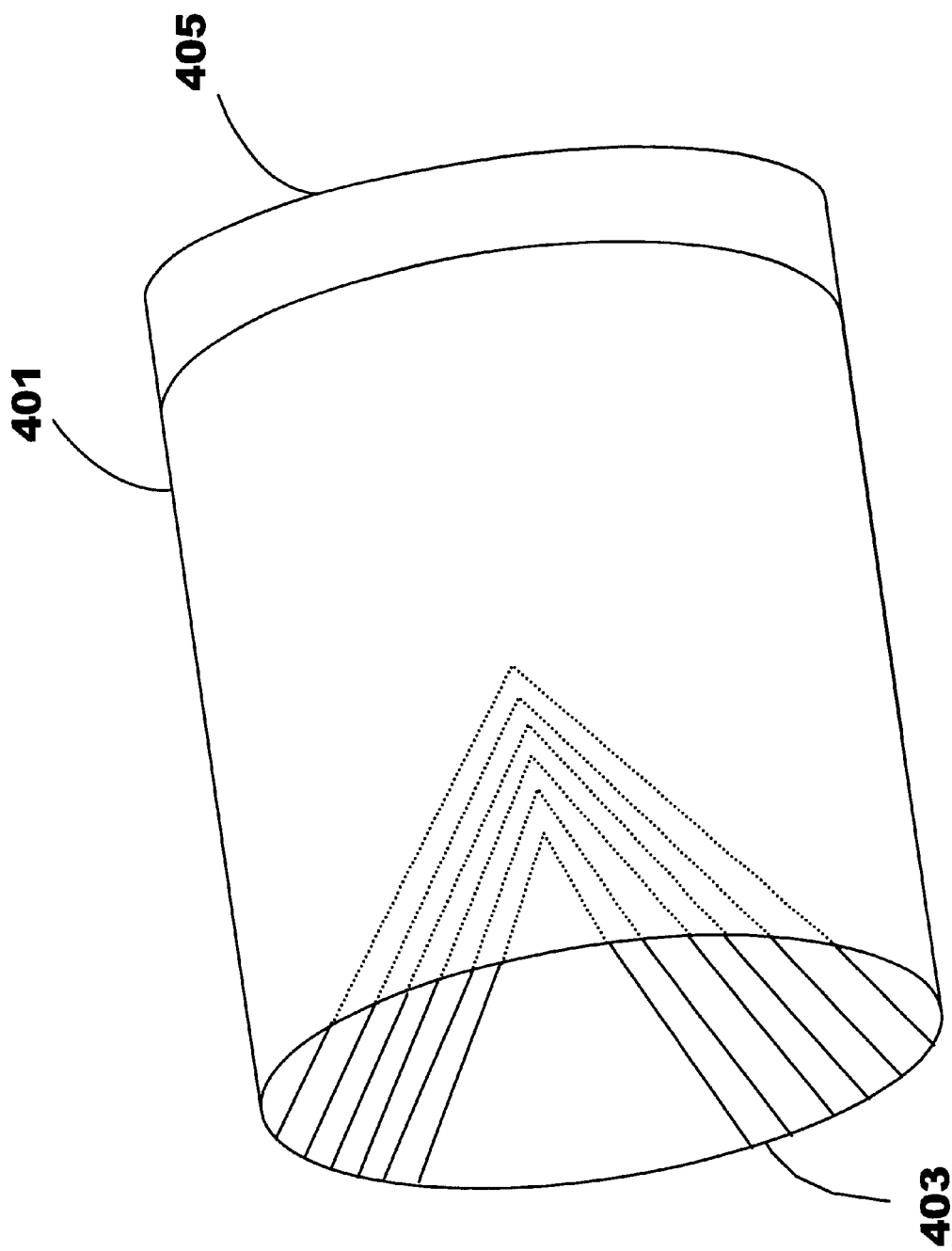
FIG. 4 shows an optical rod having a cone milled into one end.
Figure 5:
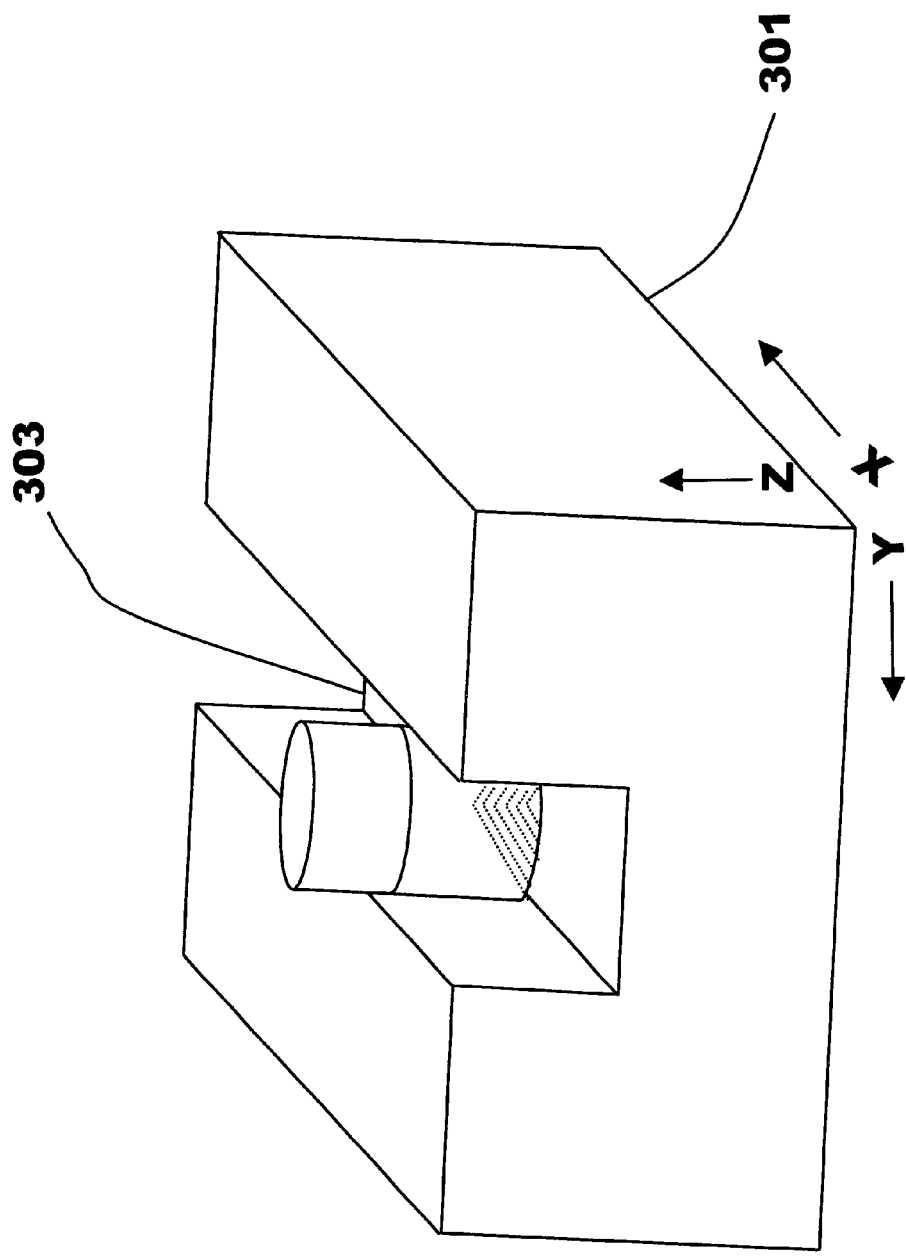
FIG. 5 illustrates the placement of an optical rod in the data bus.

FIGS. 4 and 5 show a low-cost means for inserting an optical signal into an optical data bus when the signal source is orthogonal to the optical medium as in the case of the transceiver position with respect to the groove when circuit cards 101 of FIG. 1 and cylindrical substrate 301 of FIG. 3 are fitted together correctly in accordance with above description. Most extant optical transmission systems are point-to-point, that is, an optical signal is injected into one end of an optical channel and detected at the other end. In such systems, alignment of the source and detector with the optical channel can be critical. If it is desired that a signal be injected into the channel or detected at some point other than the end of the channel, an optical gradient needs to be used. Careful alignment of the components is necessary because the emitter/detector is at a non-orthogonal angle to the optical channel and each gradient inserted into the optical medium may introduce a transmission loss of up to 50%.

A solution to avoid such losses is depicted in FIG. 4 which shows optically conductive rod 401 made of a suitable polymer material that has milled into one end thereof cone 403. An optical transceiver 405 is attached to the other end of the rod, above the apex of the cone. This rod-transceiver combination unit is inserted directly into the optical medium of groove 303 at a right angle to the groove as shown in FIG. 5. When the transceiver generates an optical signal, the signal travels down the rod and reflects from the cone in all directions, with a portion of the reflected signal travelling down the optical medium. When the travelling signal strikes another like-positioned cone along the way, then the signal is reflected by the second cone up its corresponding rod into the second transceiver. It is envisioned by the inventors that the slope of the cones be 45 degrees, that their height be one half of the value of the depth of groove 303 and that the surface of the cone be treated suitably to enhance its reflectivity. It is further envisioned that the height of rod 401 equals the depth of groove 303 and the tranceiver is mounted to protrude above the groove. Any number of the rod-transceiver combination units can be embedded into one or more grooves to achieve a desired result.

Figure 6:
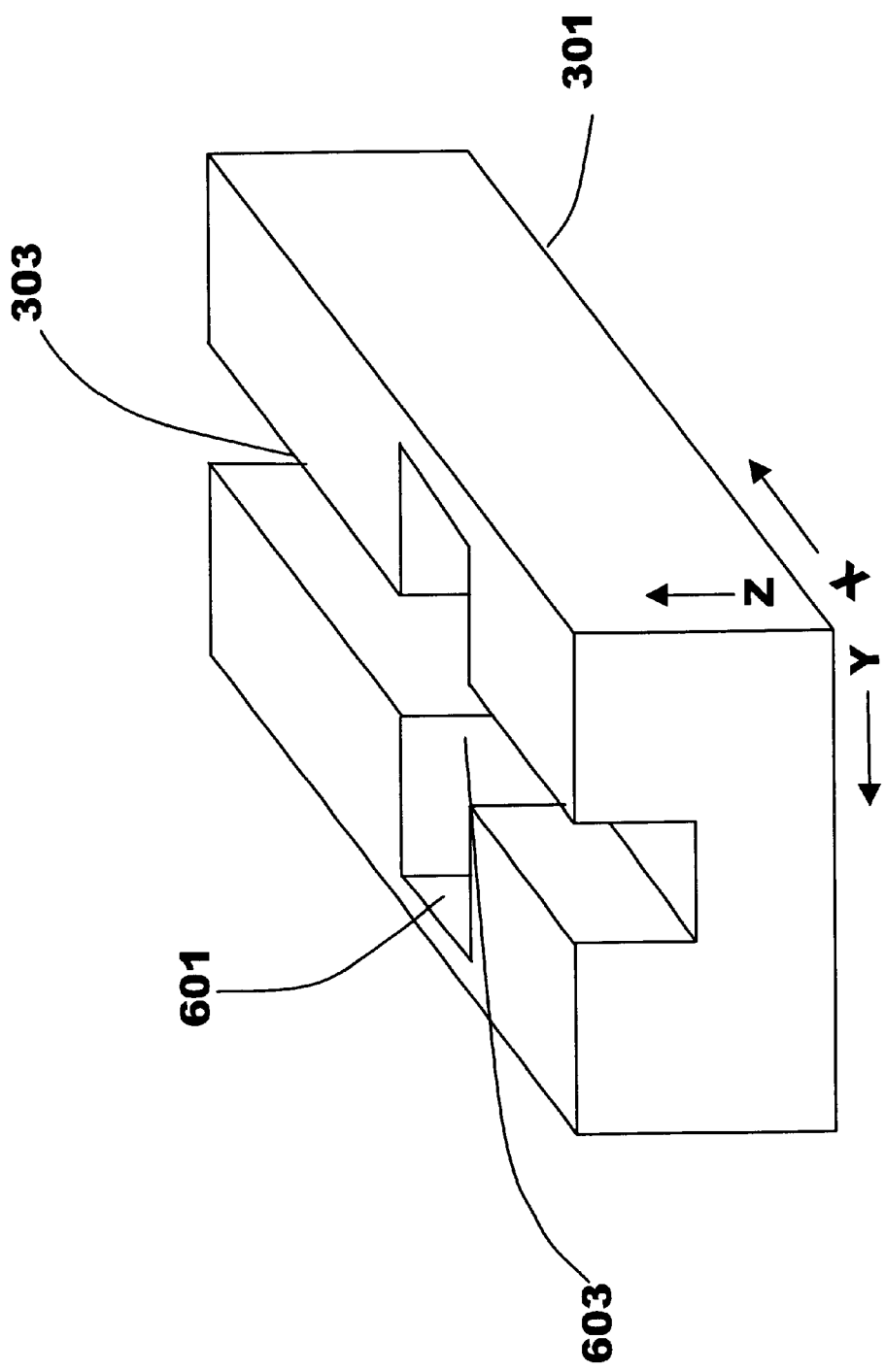
FIG. 6 is a representative diagram of the relative positions of a primary groove and a secondary groove on the outer surface of the cylindrical substrate.
Figure 7:
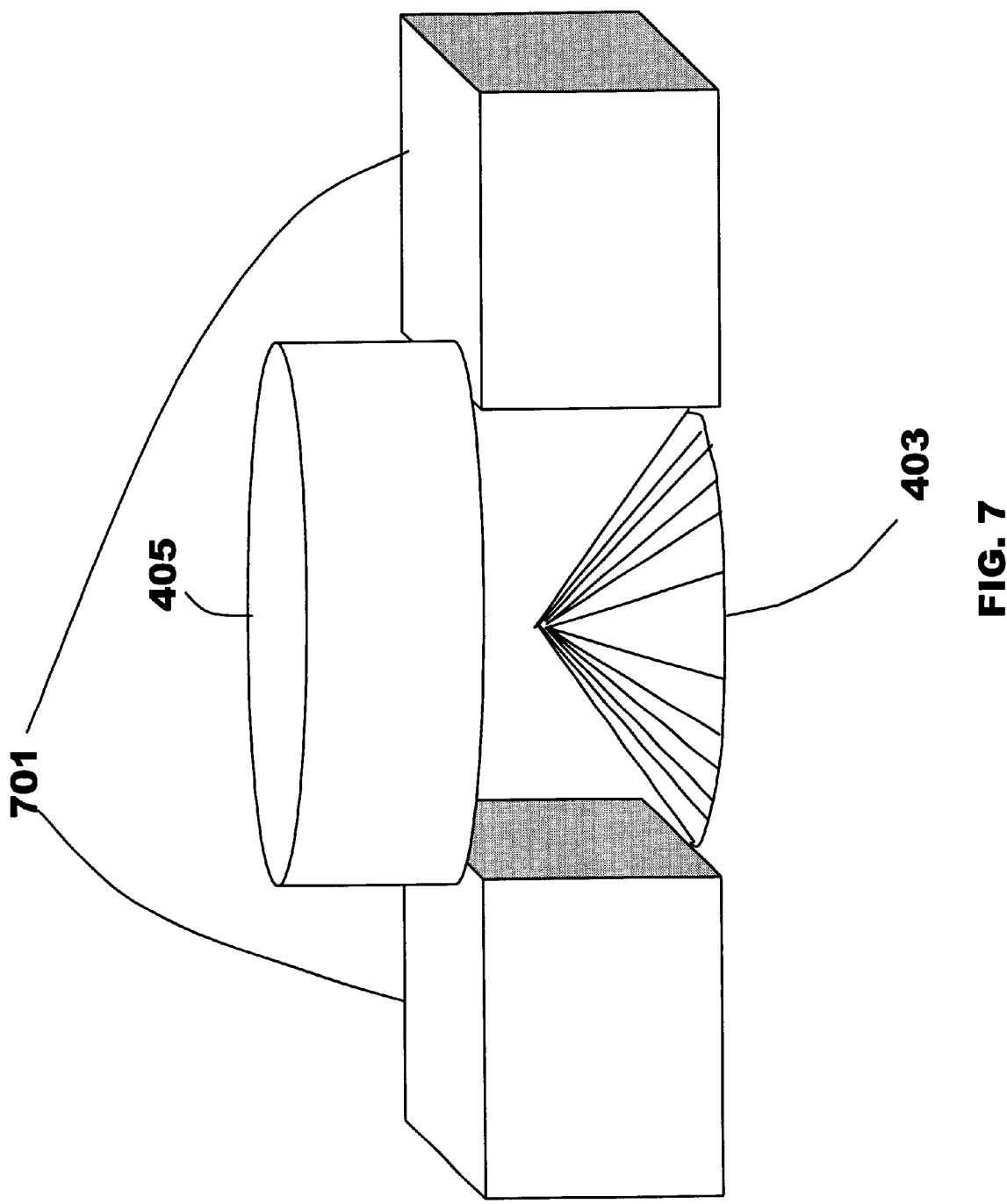
FIG. 7 shows details of the integration positions of the optical transceiver, the conical structure and the alignment blocks.
Figure 8:
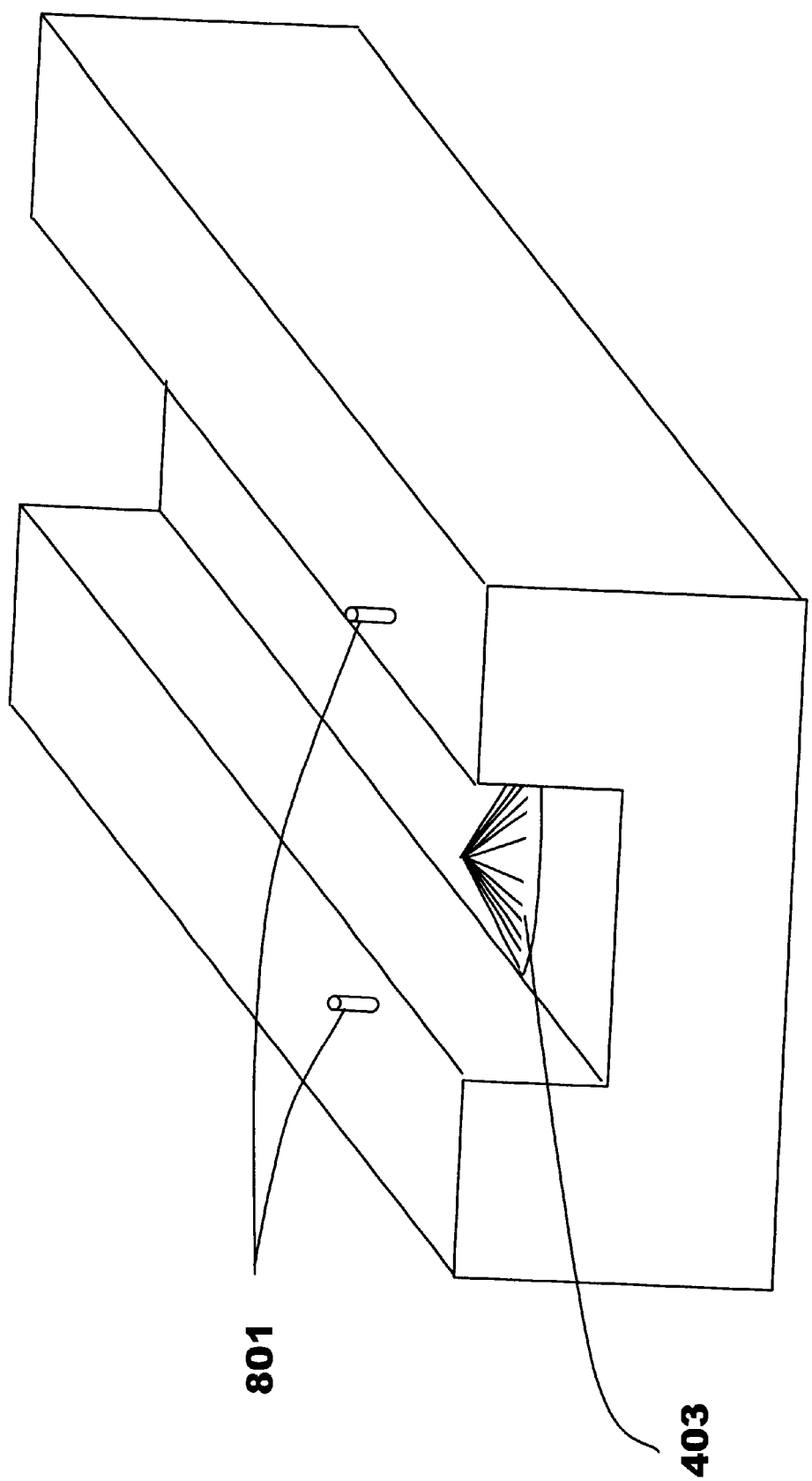
FIG. 8 indicates a possible position of alignment pins.

FIGS. 6 and 7 show another low-cost means for injecting and retrieving optical signals. A representative primary groove 303 and a representative secondary groove 601 cross each other at right angle. At the intersection 603, reflective cone 403 is placed with its apex pointing up. This cone is maintained in place by two optional alignment blocks 701 which fit into the secondary groove on opposing sides of the cone. Transceiver 405, mounted above the cone, emits an optical signal which travels down the polymer rod (not depicted in FIGS. 6 and 7) between the cone and the transceiver and, from the cone, is reflected in all directions. Thereafter, a portion of the reflected signal is captured by a second cone down the groove and reflected again in all directions. A transceiver above the second cone processes the signal for appropriate use. Alternatively, cone 403 may be fabricated directly into the base of the groove. In such a case, the optical transceiver should be aligned with the cone via alignment pins 801 which are mounted directly into the substrate. This alternative design obviates the need for secondary grooves. Also, it is noted that even though FIGS. 5, 6 and 8 show the substrate underlying a groove as a rectangular form, it is for illustration purposes only and the entire substrate is of cylindrical shape. However, it is possible that the substrate may be "unrolled" and presented in a rectangular form if cylindrical hole 305 is not necessary for any given application.

Although a particular embodiment and form of this invention has been illustrated, it is apparent that various modifications and embodiments of the invention may be made by those skilled in the art without departing from the scope and spirit of the foregoing disclosure. Accordingly, the scope of the invention should be limited only by the claims appended hereto.

We claim:

1. A device for transmitting optical signals between multiple stations, said device comprising:
    a cylindrical substrate having a cavity passing therethrough;
    a plurality of identical parallel grooves inscribed onto the outer surface of said substrate, said grooves being positioned along the length of said cylindrical substrate and being separated from each other by a pre-determined distance;
    several circuit cards susceptible to being aligned longitudinally, each of said cards having therethrough a central hole, said hole being sufficient for inserting therethrough said cylindrical substrate;
    at least one optical transceiver located on each said card, said transceiver being capable of sending and receiving optical signals, said transceiver being mounted onto the perimeter of said central hole of said card so as to be orthogonal to one of said grooves when said cylindrical substrate is inserted through said central hole, thereby enabling said transceiver to inject optical signals into said groove wherein said optical signal may travel by internal reflection until received by another transceiver.

2. A device for transmitting optical signals between multiple stations as described in claim 1, wherein said grooves are rectangular in shape and equal in width and depth.

3. A device as described in claim 2, wherein said grooves are filled with a pre-selected optically transmissive polymer.

4. A device for transmitting optical signals between multiple destinations, said device comprising:
    a cylindrical substrate having a cavity passing through the center thereof and a plurality of identical parallel grooves inscribed onto the outer surface of said substrate, said grooves being positioned along the length of said cylindrical substrate and being separated from each other by a pre-determined distance;
    at least a first and a second optically transparent rods located in one of said grooves, said first rod having at one end thereof a first conical cavity and said second rod having at one end thereof a second conical cavity;
    at least a first and a second optical transceivers, said transceivers being mounted above the apexes of said conical cavities, one transceiver above one apex, said rods being positioned in said groove such that said transceivers protrude above said groove, said first transceiver being capable of emitting optical signals toward said first conical cavity and said first conical cavity reflecting said signals into multiple directions so as to enable a portion of said signals to travel down said groove until intercepted by said second conical cavity and be reflected thereby, some of said reflected signals being received by said second transceiver.

5. A device for transmitting optical signals between multiple destinations as described in claim 4, wherein the surface of each of said conical cavities slopes at a 45 degree angle and is treated to enhance reflectivity.

6. A device for transmitting optical signals between multiple destinations as described in claim 5, wherein each of said grooves is filled with a suitable optically transmissive medium.

7. A device as described in claim 6, wherein each of said grooves has at least two of said rods embedded in said medium, said rods being separated by a pre-chosen distance.

8. A device as described in claim 7, wherein said grooves are rectangular in shape and are equal in width and depth.

9. A device as described in claim 8, wherein the height of each of said rods equals the depth of said grooves and the height of each of said conical cavities is equal to one half of the depth of said grooves.

10. A device for transmitting optical signals between multiple destinations, said device comprising:

a cylindrical substrate having a cavity passing through the center thereof;

a plurality of identical primary parallel grooves inscribed onto the outer surface of said substrate, said primary grooves being positioned along the length of said cylindrical substrate and being separated from each other by a pre-determined distance and a plurality of identical secondary parallel grooves inscribed onto the outer surface of said substrate, said secondary grooves being positioned so as to be orthogonal to said primary grooves; and several signal-injecting-and-receiving means, each of said means being placed at the intersection between one of said primary grooves and one of said secondary grooves.

11. A device for transmitting optical signals between multiple destinations as set forth in claim 10, wherein each of said signal-injecting-and-receiving means comprises an optical cone, said cone reflecting in multiple directions any light incident thereon;

a pair of alignment blocks inserted into one of said secondary grooves, said blocks bracketing said cone between them such that said cone sits in said primary groove; an optical transceiver suitable for transmitting and receiving optical signals, said transceiver being mounted above said cone; and an optically transmissive rod, said rod being positioned between said transceiver and said cone.

12. A device for transmitting optical signals between multiple destinations as set forth in claim 11, wherein said primary grooves are rectangular in shape and are equal in width and depth.

13. A device as set forth in claim 12, wherein the height of each of said cones is one half of the depth of said primary grooves.

14. A device as set forth in claim 13, wherein the surfaces of said cones are treated for enhanced reflectivity.

15. A device for transmitting optical signals between multiple stations, said device comprising:

a substrate having a plurality of identical parallel grooves inscribed onto the outer surface thereof, said grooves being positioned along the length of said substrate and being separated from each other by a pre-determined distance;

several circuit cards susceptible to being aligned together longitudinally, each of said cards being mounted onto said substrate;

at least one optical transceiver located on each said circuit card, said transceiver being capable of sending and receiving optical signals, said transceiver being positioned on said card so as to be orthogonal to one of said grooves when said card is mounted onto said substrate, thereby enabling said transceiver to inject optical signals into said groove wherein said optical signal may travel by internal reflection until received by another transceiver.

16. A device for transmitting optical signals between multiple stations as described in claim 15, wherein said grooves are rectangular in shape and equal in width and depth.

17. A device as described in claim 16, wherein said grooves are filled with a pre-selected optically transmissive polymer.

* * * * *